US012689278B2

(12) United States Patent
Unno et al.

(10) Patent No.: US 12,689,278 B2
(45) Date of Patent: Jul. 21, 2026

(54) MODULE SYSTEM

(71) Applicant: THK CO., LTD., Tokyo (JP)

(72) Inventors: Akihiro Unno, Tokyo (JP); Tsuyoshi Inda, Tokyo (JP); Akira Ishihara, Tokyo (JP); Takamitsu Tomiyama, Tokyo (JP); Yuichi Mizutani, Tokyo (JP); Kazuto Homma, Tokyo (JP)

(73) Assignee: THK CO., LTD., Tokyo (JP)

( * ) Notice: Subject to any disclaimer, the term of this patent is extended or adjusted under 35 U.S.C. 154(b) by 184 days.

(21) Appl. No.: 18/713,861

(22) PCT Filed: Nov. 22, 2022

(86) PCT No.: PCT/JP2022/043155
§ 371 (c)(1),
(2) Date: May 28, 2024

(87) PCT Pub. No.: WO2023/100717
PCT Pub. Date: Jun. 8, 2023

(65) Prior Publication Data
US 2025/0038633 A1 Jan. 30, 2025

(30) Foreign Application Priority Data
Nov. 30, 2021 (JP) ................................. 2021-194434

(51) Int. Cl.
*H02K 41/035* (2006.01)

(52) U.S. Cl.
CPC ..... *H02K 41/0358* (2013.01); *H02K 2213/12* (2013.01)

(58) Field of Classification Search
CPC ........... H02K 41/0358; H02K 2213/12; H02K 41/02; H02K 1/18; H02K 15/14;
(Continued)

(56) References Cited

U.S. PATENT DOCUMENTS

| | | | |
|---|---|---|---|
| 2020/0010287 A1* | 1/2020 | Urata | ..................... B65G 54/02 |
| 2025/0038633 A1* | 1/2025 | Unno | ................ H02K 41/0358 |

FOREIGN PATENT DOCUMENTS

| | | |
|---|---|---|
| CN | 112688450 A | 4/2021 |
| JP | 4-210764 A | 7/1992 |

(Continued)

OTHER PUBLICATIONS

International Search Report dated Feb. 7, 2023, issued in counterpart International Application No. PCT/JP2022/043155, with English Translation. (4 pages).

(Continued)

*Primary Examiner* — Ahmed Elnakib

(74) *Attorney, Agent, or Firm* — WHDA, LLP

(57) ABSTRACT

A module system is configured by positioning a first module in which a first guide device is incorporated and a second module in which a second guide device is incorporated along a guide direction. The module system includes a first positioning portion configured to position the first module and the second module in such a manner that a gap between the first guide device and the second guide device is a predetermined distance. The module system further includes a second positioning portion configured to position the first module and the second module in such a manner that a shift between an axial direction of the first guide device and an axial direction of the second guide device in a direction orthogonal to the guide direction in a plan view is equal to or less than a predetermined amount of shift.

4 Claims, 8 Drawing Sheets

(58) Field of Classification Search
CPC ...... H02K 41/031; B65G 54/02; B65G 9/008;
B65G 2811/09
USPC ...................................................... 310/12.31
See application file for complete search history.

(56)                         References Cited

FOREIGN PATENT DOCUMENTS

| | | | | |
|----|----------------|---|---------|-------------|
| JP | 5-140903 A | | 6/1993 | |
| JP | 2000312463 | * | 11/2000 | ............. H02K 41/02 |
| WO | 2018/055708 A1 | | 3/2018 | |

OTHER PUBLICATIONS

Office Action dated Dec. 23, 2025, issued in counterpart TW
Application No. 111144493, with English translation. (18 pages).

* cited by examiner

[Fig. 1]
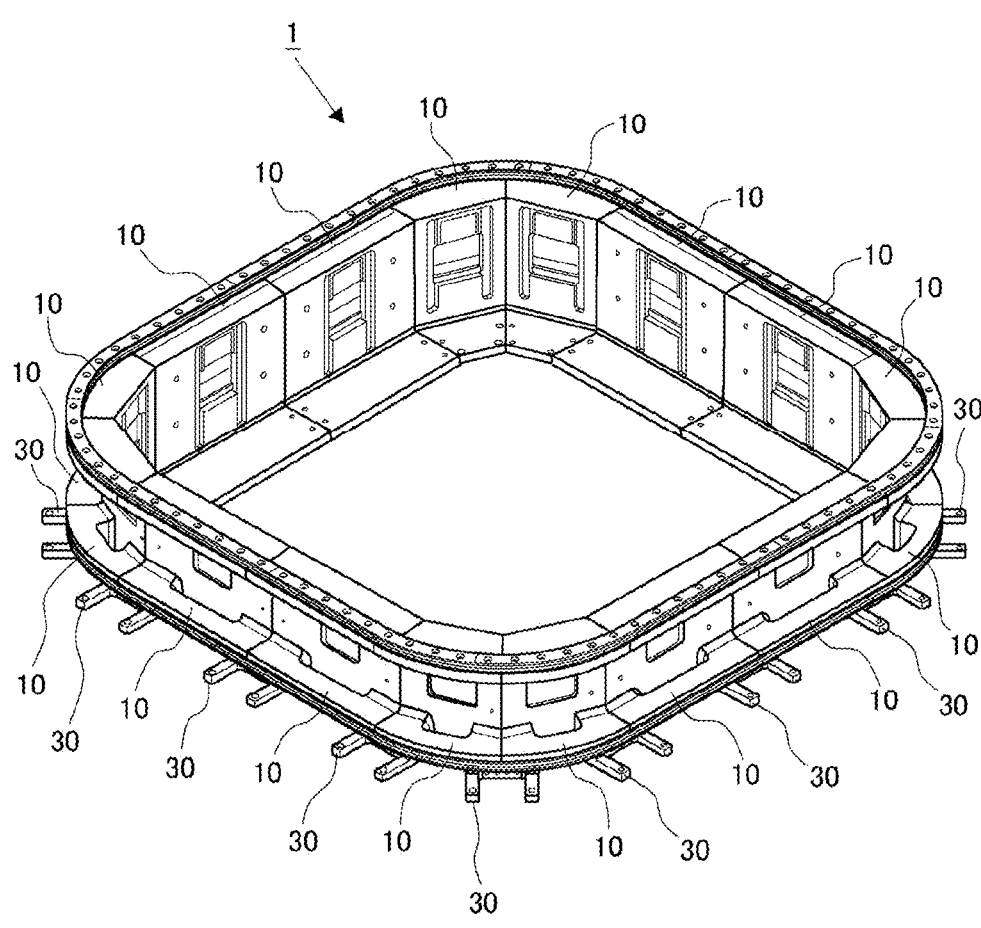

[Fig. 3]
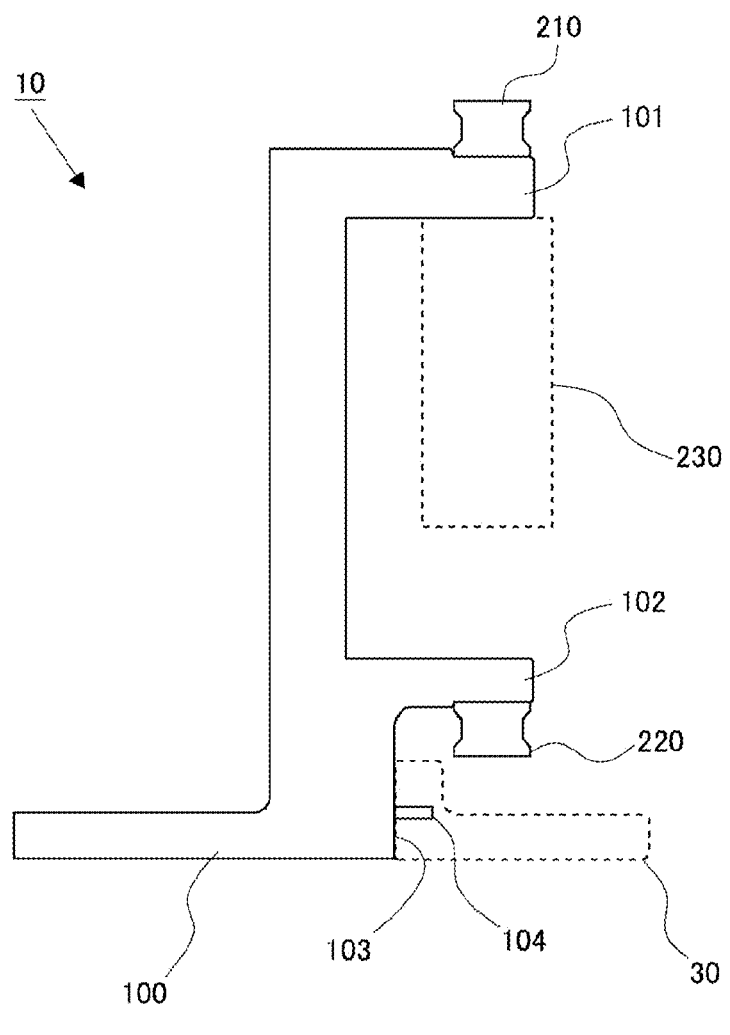
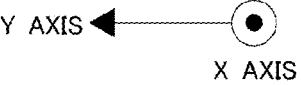
Y AXIS ← ⊙ X AXIS

[Fig. 4]
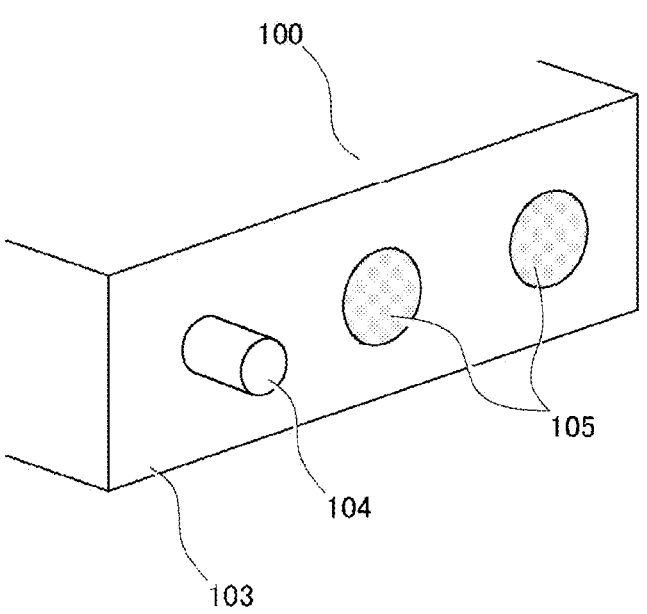

[Fig. 5]
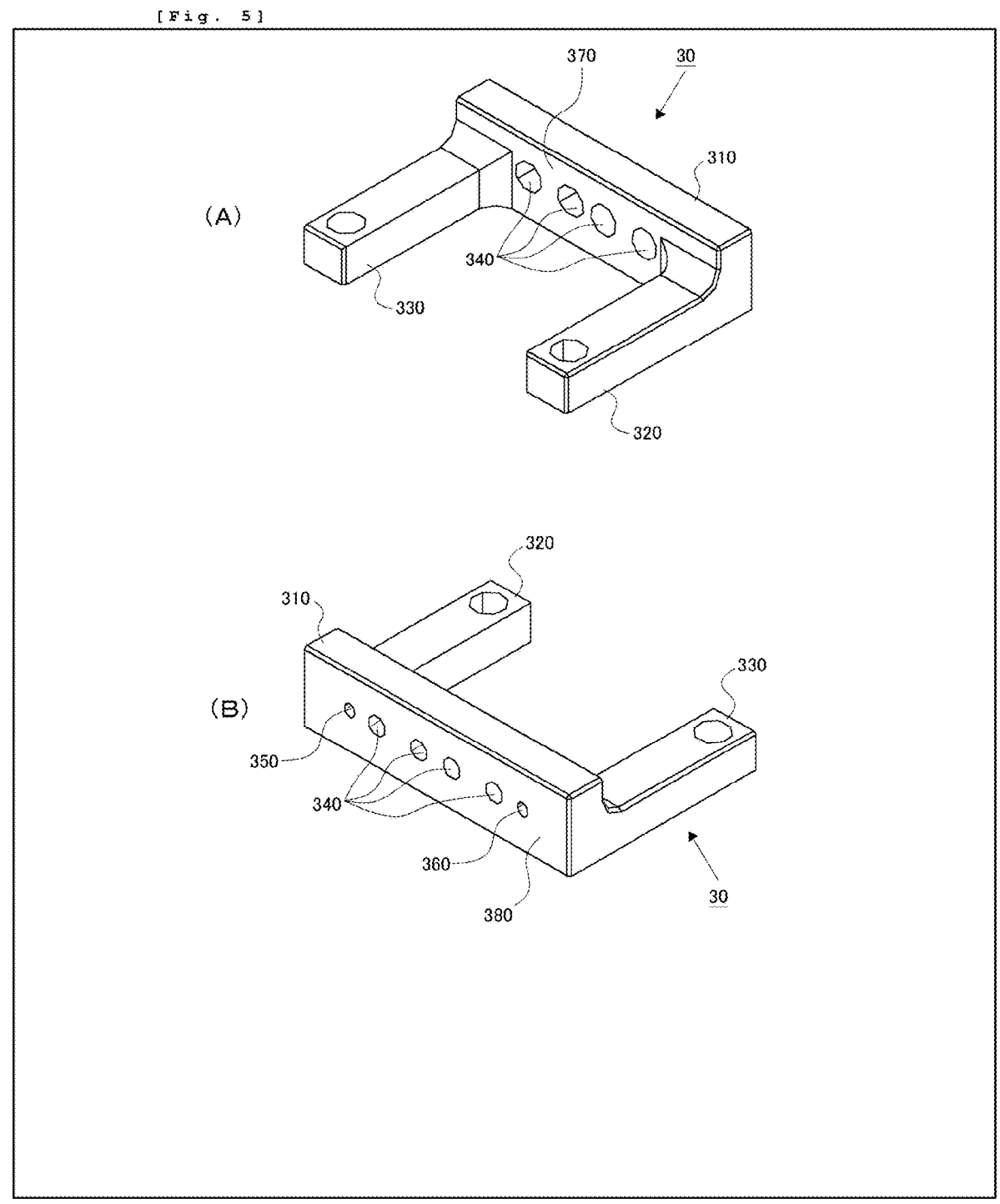

[Fig. 6]
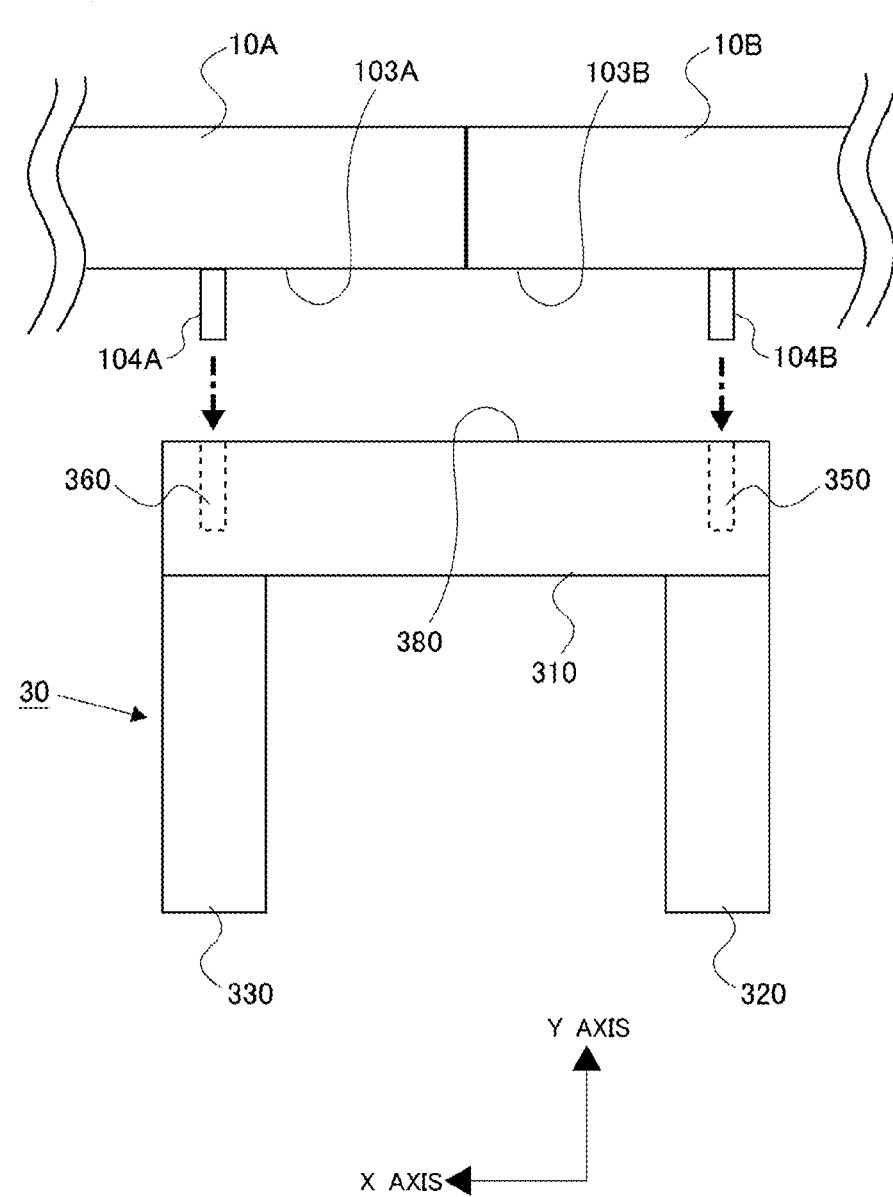

[Fig. 7]
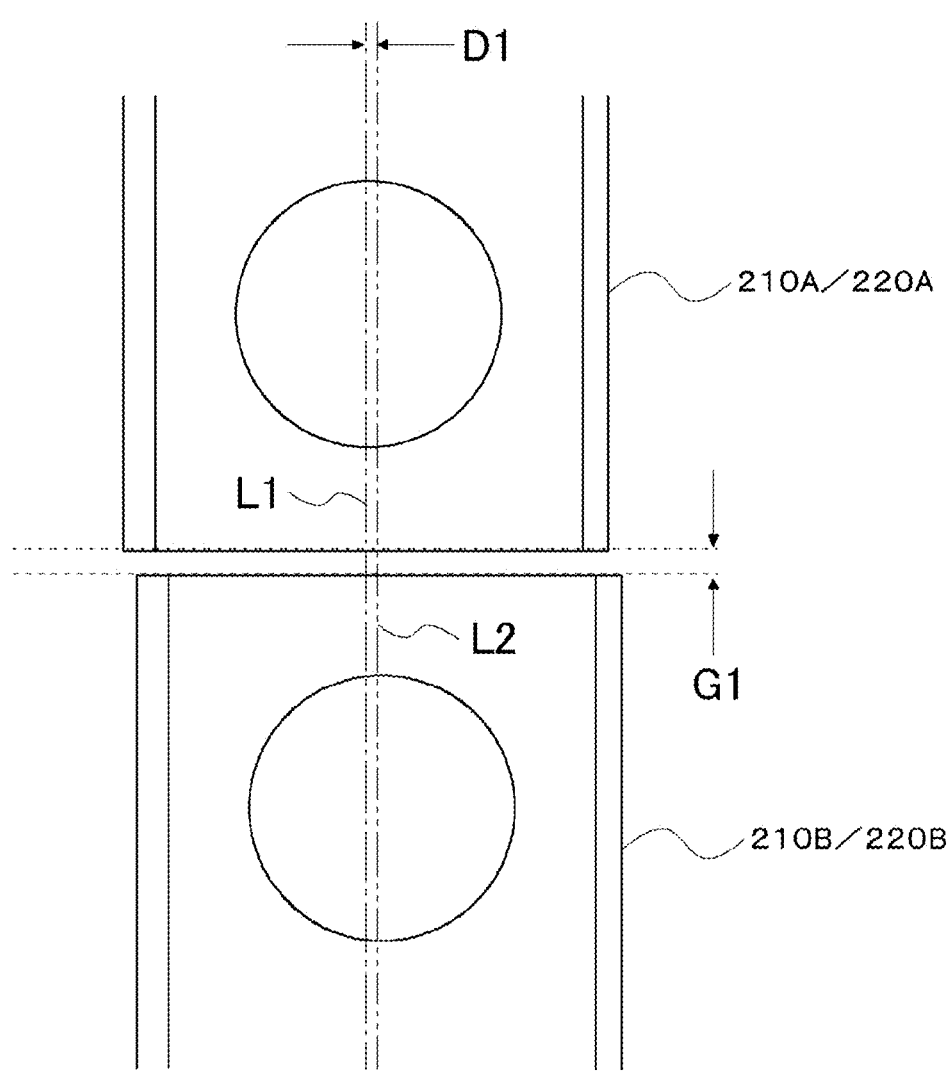
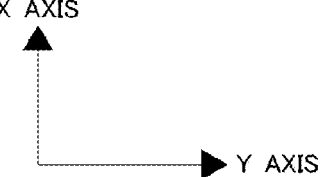

[Fig. 8]
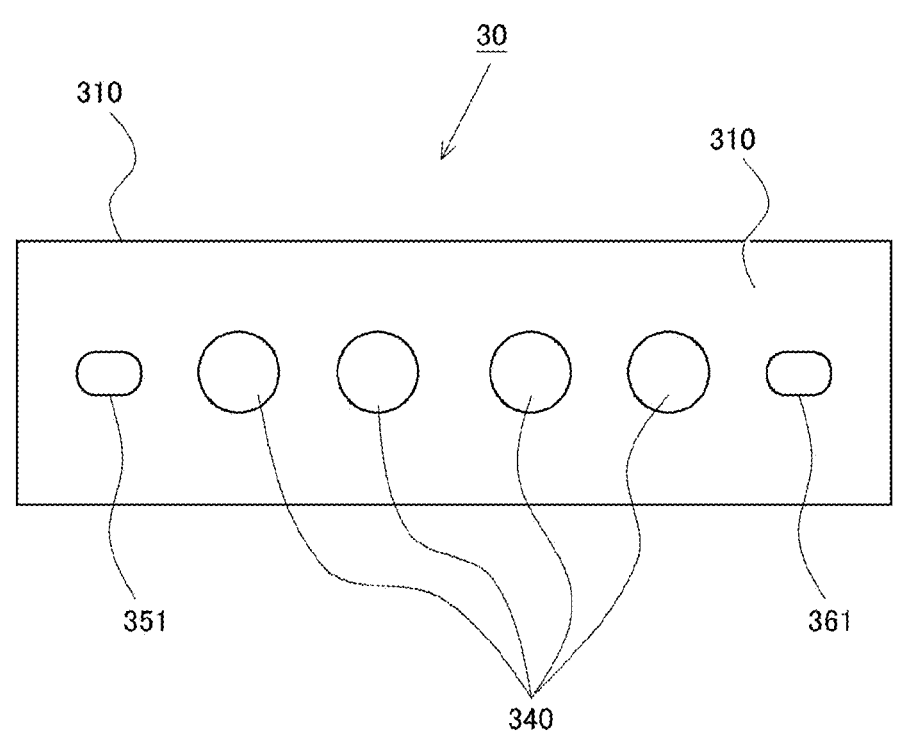
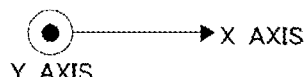
X AXIS
Y AXIS

MODULE SYSTEM

TECHNICAL FIELD

The present invention relates to a module system that is composed of modules which are connected together and in which guide devices are incorporated.

BACKGROUND ART

A configuration has been proposed in which a convex portion is provided on one of stator blocks to be connected to each other and a concave portion is provided on the other, and the convex portion and the concave portion are fitted to each other to connect the stator blocks to each other (for example, see Patent Literature 1).

CITATION LIST

Patent Literature

Patent Literature 1: Japanese Patent Application Laid-Open No. 4-210764

SUMMARY OF INVENTION

Technical Problem

A module system is conceivable that is composed of modules which are connected together and in which guide devices are incorporated. When assembling such a module system, it is necessary to connect the modules together while optimizing the relative positions of the guide devices between the modules. For example, when a first module having a first guide device incorporated therein and a second module having a second guide device incorporated therein are connected to each other along a guide direction, it is necessary to position the first module and the second module in such a manner that a gap between the first guide device and the second guide device in the guide direction and a shift in the positions of the first guide device and the second guide device in a direction orthogonal to the guide direction in a plan view are within an appropriate range. In particular, when three or more modules are connected to assemble an endless circulation type module system, the work of positioning the modules may become complicated.

The present invention has been made in view of the above circumstances, and an object of the present invention is to provide a technique capable of easily performing positioning of modules when the modules having guide devices incorporated therein are connected to each other.

Solution to Problem

One of the aspects of the present invention is directed to a module system comprising a first module in which a first guide device is incorporated and a second module in which a second guide device is incorporated, the first module and the second module being positioned along a guide direction, the module system further comprising:

a first positioning portion configured to position the first module and the second module in such a manner that a gap between an end portion of the first guide device on a second module side and an end portion of the second guide device on a first module side is a predetermined distance; and a second positioning portion configured to position the first module and the second module in such a manner that a shift between an axial direction of the first guide device and an axial direction of the second guide device in a direction orthogonal to the guide direction in a plan view is equal to or less than a predetermined amount of shift.

Advantageous Effects of Invention

According to the present invention, it is possible to provide a technique capable of easily performing positioning of modules when the modules having guide devices incorporated therein are connected to each other.

BRIEF DESCRIPTION OF THE DRAWINGS

FIG. 1 is a view illustrating an example of a module system.

FIG. 3 is a side view of a module as seen from an X-axis direction.

FIG. 4 is an enlarged perspective view of an attachment surface.

In FIG. 5, (A) is a first perspective view of a connecting member, and (B) is a second perspective view of the connecting member as seen from a direction different from the first perspective view.

FIG. 6 is a view for explaining a method of attaching the connecting member in the case of connecting a first module and a second module.

FIG. 7 is a view illustrating the relative positions of a first track rail and a second track rail when the first module and the second module are connected to each other by the connecting member.

FIG. 8 is a view illustrating a configuration of a connecting member in a modification.

DESCRIPTION OF EMBODIMENTS

Figures 2A, 2B:
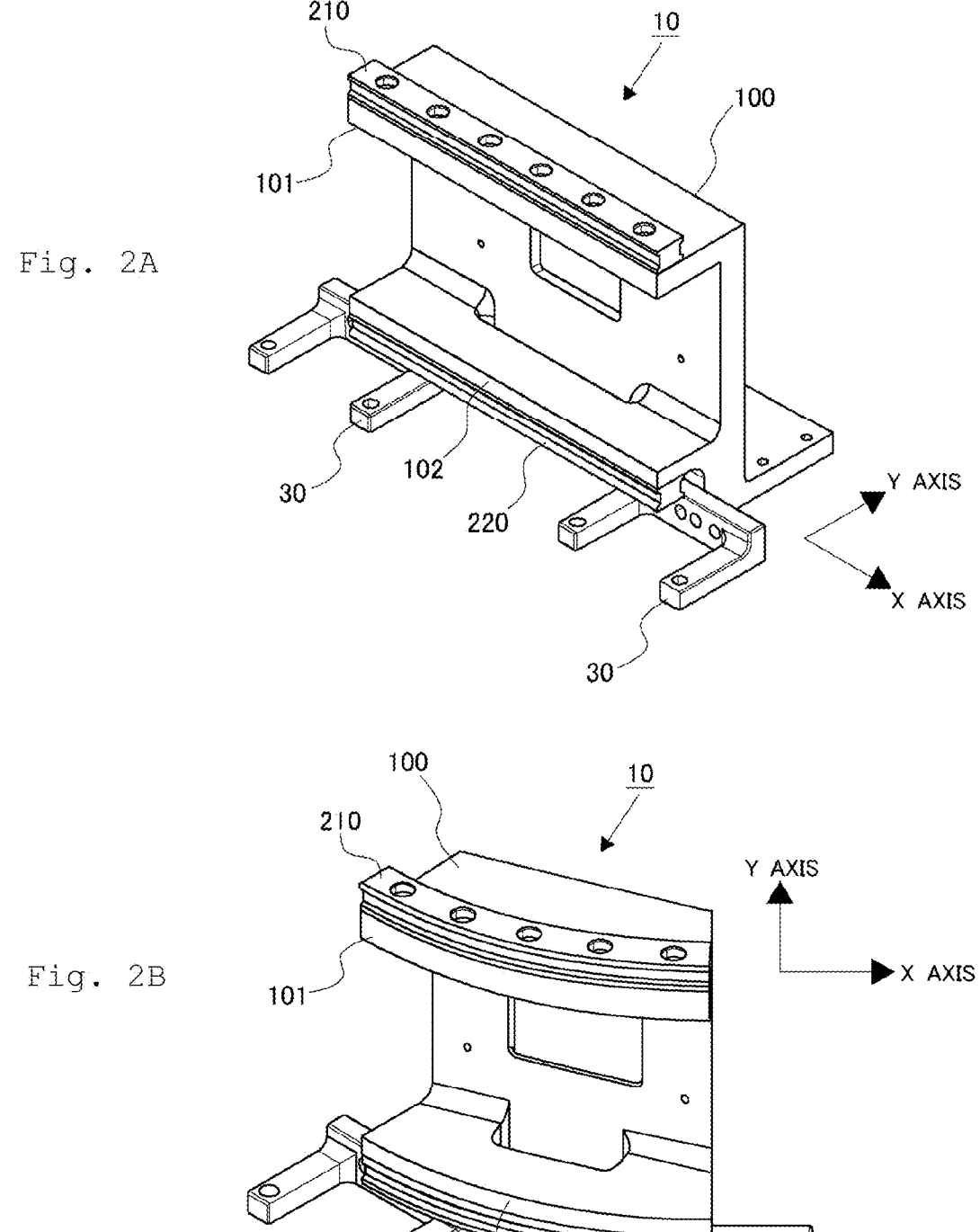
FIG. 2A is a perspective view of a module in which a linear track rail is incorporated.
FIG. 2B is a perspective view of a module in which a curved track rail is incorporated.

A module system, which is one of the aspects of the present invention, is formed by connecting a first module in which a first guide device is incorporated and a second module in which a second guide device is incorporated to each other along a guide direction. The first module and the second module are positioned and connected along the guide direction.

The number of modules forming the module system according to the present invention is not limited to two. For example, it is also possible to configure a module system composed of four or more modules by alternately connecting a plurality of first modules and a plurality of second modules. In this case, the plurality of the first modules may have identically shaped guide devices or differently shaped guide devices. Likewise, the plurality of second modules may have guide devices of the same shape or may have guide devices of different shapes. For example, a first module having a linear guide device, a first module having a curved guide device, a second module having a linear guide device, and a second module having a curved guide device can be combined with one another to form an endless circulation type module system.

The module system according to the present invention includes a first positioning portion and a second positioning portion. The first positioning portion is configured to position the first module and the second module in such a manner that a gap between an end of a first guide device on a second module side and an end of a second guide device on a first module side is a predetermined distance. Also, the second positioning portion is configured to position the first module and the second module in such a manner that a shift between an axial direction of the first guide device and an axial direction of the second guide device in a direction orthogonal to the guide direction in a plan view is equal to or less than a predetermined amount of shift. Note that in cases where at least one of the first guide device and the second guide device is a guide device formed in a curved shape, the guide direction and the axial direction of this guide device are the guide direction and the axial direction at each end of this guide device.

According to the module system of the present invention, when the first module and the second module are connected, the first module and the second module are positioned by the first positioning portion in such a manner that the gap between the end portion of the first guide device on the second module side and the end portion of the second guide device on the first module side is the predetermined distance. Further, the first module and the second module are also positioned by the second positioning portion in such a manner that the shift between the axial direction of the first guide device and the axial direction of the second guide device in the direction orthogonal to the guide direction in a plan view is equal to or less than the predetermined amount of shift. As a result, the positioning of the first module and the second module upon connection thereof can be easily performed. That is, even a person who does not have special skills can assemble the module system.

Here, the first positioning portion according to the present invention may be configured to include a first pin, a second pin, and a first connecting member. The first pin may be provided on the first module and configured to protrude in the direction orthogonal to the guide direction in a plan view. The second pin may be provided on the second module and configured to protrude in the direction orthogonal to the guide direction in a plan view. The first connecting member may have a first fitting hole and a second fitting hole arranged in the guide direction, and may be configured to be fixed to the first module and the second module in a state where the first pin is fitted into the first fitting hole and the second pin is fitted into the second fitting hole. The fixing of the first connecting member to the first module and the fixing of the first connecting member to the second module may be done, for example, by fastening bolts or the like.

In cases where the first positioning portion is configured to include the first pin, the second pin, and the first connecting member, a worker who assembles the module system may perform an operation of fixing the first connecting member to the first module and the second module by fitting the first pin into the first fitting hole and fitting the second pin into the second fitting hole. In this way, when the first module and the second module are connected by the first connecting member, the first module and the second module are positioned in such a manner that the gap between the end portion of the first guide device on the second module side and the end portion of the second guide device on the first module side becomes the predetermined distance.

Note that at least one of the first fitting hole and the second fitting hole in the first positioning portion may be formed to have a length in the guide direction larger than the diameters of the first pin and the second pin. In the case where the first positioning portion is configured in this way, the worker who assembles the module system can finely adjust the relative positions of the first module and the second module in the guide direction in a state where the first pin is fitted into the first fitting hole of the first connecting member and the second pin is fitted into the second fitting hole of the first connecting member, and in a state before the first connecting member is fixed to the first module and the second module. Thus, for example, in the case where an infinitely circulating module system is formed by alternately connecting a plurality of first modules and a plurality of second modules, it is possible to finely adjust gaps between adjacent modules in the guide direction (gaps between adjacent end portions of the guide devices). As a result, it is possible to suppress gaps between some modules from becoming too wide or gaps between some modules from becoming too narrow.

In addition, the second positioning portion according to the present invention may be configured to include a first attachment surface, a second attachment surface, and a second connecting member. The first attachment surface may be provided in the vicinity of an end portion of a side face of the first module on the second module side, and formed by a vertical surface extending along the guide direction. The second attachment surface may be provided in the vicinity of an end portion of a side face of the second module on the first module side, and formed by a vertical surface extending along the guide direction. The second connecting member may be fixed to the first attachment surface and the second attachment surface in such a manner that the first attachment surface and the second attachment surface are flush with each other. The fixing of the second connecting member to the first attachment surface of the first module and the fixing of the second connecting member to the second attachment surface of the second module may be done, for example, by fastening bolts or the like.

In the case where the second positioning portion is configured to include the first attachment surface, the second attachment surface, and the second connecting member, the worker assembling the module system may perform a n operation of fixing the second connecting member to the first attachment surface of the first module and the second attachment surface of the second module. In this way, when the first attachment surface and the second attachment surface are connected by the second connecting member, the first module and the second module are positioned in such a manner that the shift between the axial direction of the first guide device and the axial direction of the second guide device in the direction orthogonal to the guide direction in a plan view is equal to or less than a predetermined amount of shift.

Here, the first connecting member and the second connecting member may be integrally formed with each other. In this case, the first pin may be provided on the first attachment surface, and the second pin may be provided on the second attachment surface. In this case, the worker assembling the module system may fix the first connecting member and the second connecting member (hereinafter referred to in some cases as the "connecting members"), which are integrally formed with each other, to the first attachment surface and the second attachment surface with the first pin fitted into the first fitting hole and the second pin fitted into the second fitting hole. Thus, the first module and the second module are positioned in such a manner that the gap between the end portion of the first guide device on the second module side and the end portion of the second guide device on the first module side is the predetermined distance, and the shift between the axial direction of e first guide device and the axial direction of the second guide device in the direction orthogonal to the guide direction in a plan view is equal to or less than the predetermined amount of shift.

Hereinafter, embodiments to put the present invention into practice will be described with reference to the drawings. However, the dimensions, materials, shapes, relative arrangements and so on of component parts described in the embodiments are not intended to limit the scope of the present invention to these alone in particular as s long as there are no specific statements. In addition, the following embodiments can be combined with one another as long as such combinations are possible and appropriate.

Embodiment 1

FIG. 1 is a view illustrating an example of a module system 1 in the present embodiment. The module system 1 is formed by connecting a plurality of modules 10 via a connecting member 30. In the example illustrated in FIG. 1, the plurality of modules 10 are connected to one another in an endless circulation manner, but may be connected in a finite stroke manner.

(Configuration of Module 10)

The configuration of the module 10 included in the module system 1 will be described based on FIGS. 2 through 4. FIGS. 2A and 2B are a perspective view illustrating a schematic configuration of the module 10. FIG. 3 is a side view of the module 10. FIG. 4 is an enlarged perspective view of an attachment surface 103 of the module 10. Note that FIG. 2A is a perspective view of the module 10 in which a linear track rail is incorporated, and FIG. 2B is a perspective view of the module 10 in which a curved track rail is incorporated.

Hereinafter, a guide direction of the track rail is defined as an X-axis direction, and a direction orthogonal to the X-axis direction in a plan view is defined as a Y-axis direction. Note that for the module 10 in which the curved track rail is incorporated, the guide direction at each end of the track rail is defined as the X-axis direction. In that case, the X-Y axis direction at one end of the track rail may be different from the X-Y axis direction at the other end of the track rail, but in the example illustrated in FIG. 2B, for the sake of convenience, only the X-Y axis direction corresponding to one end (the right end in FIG. 2B) is illustrated.

As illustrated in FIGS. 2 and 3, the module 10 includes a base 100 having a substantially L-shape in a side view. On a front side (for example, the right side in FIG. 3) of the base 100, a pair of plate-shaped support portions 101-102 are provided to protrude in the horizontal direction. As illustrated in FIG. 3, a pair of track rails 210-220 are attached to the pair of support portions 101-102, respectively. In the example illustrated in FIG. 3, the track rail 210 is attached to an upper face of the support portion 101 located on an upper side of the pair of support portions 101-102, and the track rail 220 is attached to a lower face of the support portion 102 located on a lower side.

The pair of track rails 210-220 are configured to guide a moving member such as carriage along the longitudinal direction of the track rails 210-220. The moving member is assembled to the track rails 210-220 via, for example, a large number of rolling elements (balls, rollers or the like) that circulate on a circulation path in the moving member while rolling in rolling grooves of the pair of track rails 210-220. As illustrated in FIG. 3, a drive mechanism 230 for moving the moving member along the track rails 210-220 is assembled to the base 100. The drive mechanism 230 is configured to include, for example, a linear motor and an amplifier. The linear motor may be, for example, a moving coil type motor. Note that the linear motor may be incorporated in the track rails 210-220.

The track rails 210-220 in the present embodiment correspond to a guide device according to the present invention.

Further, a s illustrated in FIG. 3, an attachment surface 103 is formed in the vicinity of an end portion in the X-axis direction and in the vicinity of a bottom portion on one side face (a side face from which the support portions 101-102 protrude) of the module 10. The attachment surface 103 is formed by a vertical surface extending in the X-axis direction. As illustrated in FIG. 4, a pin 104 extending in the Y-axis direction is provided to protrude from the attachment surface 103. In addition, a plurality of female screw holes 105 are also provided on the attachment surface 103. Note that in the example illustrated in FIG. 4, two female screw holes 105 are provided, but three or more female screw holes 105 may be provided on the attachment surface 103. Such an attachment surface 103 is provided in the vicinity of each of both ends of each module 10.

Each module 10 in the present embodiment is designed and manufactured in such a manner that when an attachment surface 103 of the module 10 and an adjacent attachment surface 103 of another module 10 are flush with each other, a shift in the Y-axis direction between the axial direction of the module 10 at one end of its track rails 210-220 and the axial direction of another module 10 at adjacent end of its track rails 210-220 is equal to or less than a predetermined amount of shift. The predetermined amount of shift is a maximum amount of shift that the moving member can move from one of the track rails 210A-220A to the other of the track rails 210B-220B without any trouble, or an amount of shift obtained by subtracting a margin from the maximum amount of shift.

(Configuration of Connecting Member 30)

Next, the configuration of the connecting member 30 in the present embodiment will be described based on FIG. 5. (A) in FIG. 5 is a first perspective view of the connecting member 30. (B) in FIG. 5 is a second perspective view of the connecting member 30, as seen from a direction different from that in the first perspective view.

The connecting member 30 is a member that serves to position and connect two modules 10 along the guide direction (X-axis direction). The connecting member 30 in the present embodiment also has a function as a leg portion for stabilizing the posture of the module 10. As illustrated in (A)-(B) in FIG. 5, the connecting member 30 is configured to include a back plate portion 310 and a pair of legs 320-330.

The back plate portion 310 is formed in a plate shape extending in the vertical direction. The pair of legs 320-330 are provided to protrude in the horizontal direction from a front face 370 of the back plate portion 310. The back plate portion 310 and the pair of legs 320-330 are integrally formed in such a manner that a bottom face of the back plate portion 310 and bottom faces of the pair of legs 320-330 together form a continuous surface along the horizontal direction.

A back face 380 of the back plate portion 310 is formed by a surface (vertical surface) perpendicular to the bottom face of the back plate portion 310 and the bottom faces of the pair of legs 320-330. In addition, the back plate portion 310 is provided with a plurality of through holes 340 and a pair of fitting holes 350-360. The plurality of through holes 340 are holes for passing fastening bolts for fixing the connecting member 30 to the module 10 and penetrate from the front face 370 to the back face 380 along the horizontal direction. The pair of fitting holes 350-360 are formed by blind holes extending from the back face 380 along the horizontal direction. The pair of fitting holes 350-360 may be formed to penetrate from the back face 380 to the front face 370 along the horizontal direction.

Here, the pair of fitting holes 350-360 are formed in such a manner that the inner diameter thereof is substantially the same as the outer diameter of the pin 104 of the module 10. In addition, an interval between the pair of fitting holes 350-360 is determined in such a manner that a gap between one end of the track rails 210-220 of one module 10 and the adjacent end of the track rails 210-220 of the other module 10 becomes a predetermined distance in a state where the pin 104 of one module 10 of the two modules 10 connected by the connecting member 30 is fitted into the fitting hole 350 and the pin 104 of the other module 10 is fitted into the fitting hole 360. The "predetermined distance" referred to herein is defined as a distance that can absorb the thermal expansion of the track rails 210-220 and that is such that the gap when the track rails 210-220 are contracted do not interfere with the movement of the moving member. Such a predetermined distance is determined in consideration of manufacturing tolerances of the modules 10 and the like.

(Method of Connecting Modules)

Next, a method of connecting modules 10 in the module system 1 of the present embodiment will be described. FIG. 6 is a view for explaining a method of connecting modules 10. Here, one of two modules 10 connected by a connecting member 30 is referred to as a first module 10A, and the other is referred to as a second module 10B. Accordingly, the components of the first module 10A are denoted by adding "A" to the ends of the reference numerals. Similarly, the components of the second module 10B are denoted by adding "B" to the ends of the reference numerals.

When the first module 10A and the second module 10B are connected to each other, first, the positions of the first module 10A and the second module 10B are adjusted such that the pin 104A protruding from the attachment surface 103A of the first module 10A is in a position where it can be fitted into the fitting hole 360 of the connecting member 30, and the pin 104B protruding from the attachment surface 103B of the second module 10B is in a position where it can be fitted into the fitting hole 350 of the connecting member 30. That is, the positions of the first module 10A and the second module 10B are adjusted so that they have a positional relationship as illustrated in FIG. 6.

Then, as indicated by a dashed-dotted line arrow in FIG. 6, the connecting member 30 is attached to the first module 10A and the second module 10B in such a manner that the pin 104A of the first module 10A is fitted into the fitting hole 360 and the pin 104B of the second module 10B is fitted into the fitting hole 350. In a state where the connecting member 30 is attached to the first module 10A and the second module 10B in this way, a plurality of fastening bolts are respectively passed through a plurality of through holes 341 in the connecting member 30 and screwed into the female screw holes 105 in the first module 10A. Thereafter, the connecting member 30 is fixed to the first module 10A and the second module 10B by tightening each fastening bolt with a specified torque.

When the connecting member 30 is fixed to the first module 10A and the second module 10B in the above-described procedure, the attachment surface 103A of the first module 10A and the attachment surface 103B of the second module 10B are in close contact with the back face 380 of the connecting member 30. Thus, the attachment surface 103A of the first module 10A and the attachment surface

103B of the second module 10B are flush with each other along the back face 380 of the connecting member 30.

Here, in the module system 1 of the present embodiment, as described above, the first module 10A and the second module 10B are designed and manufactured in such a manner that when the attachment surface 103A of the first module 10A and the attachment surface 103B of the second module 10B are flush with each other, a shift in the Y-axis direction between the axial direction of the track rails 210A-220A at their end portions on the second module 10B side and the axial direction of the track rails 210B-220B at their end portions on the first module 10A side becomes equal to or less than the predetermined amount of shift.

Therefore, when the attachment surface 103A of the first module 10A and the attachment surface 103B of the second module 10B are flush with each other by connecting the first module 10A and the second module 10B to each other by means of the connecting member 30, as illustrated in FIG. 7, the first module 10A and the second module 10B will be positioned in such a manner that an amount of shift (D1 in FIG. 7) in the Y-axis direction between the axial direction (L1 in FIG. 7) of the track rails 210A-220A at their end portions on the second module 10B side and the axial direction (L2 in FIG. 7) of the track rails 210B-220B at their end portions on the first module 10A side becomes equal to or less than the predetermined amount of shift.

In addition, in the module system 1 of the present embodiment, as described above, the interval between the pair of fitting holes 350-360 in the connecting member 30 is determined in such a manner that the gap between the end portions of the track rails 210A-220A the second module 10B side and the end portions of the track rails 210B-220B on the first module 10B side becomes equal to or less than the predetermined distance in a state where the pin 104A of the first module 10A is fitted into the fitting hole 360 and the pin 104B of the second module 10B is fitted into the fitting hole 350.

Accordingly, when the first module 10A and the second module 10B are connected by the connecting member 30 in a state where the pin 104A of the first module 10A is fitted into the fitting hole 360 of the connecting member 30 and the pin 104B of the second module 10B is fitted into the fitting hole 350 of the connecting member 30, as illustrated in FIG. 7, the first module 10A and the second module 10B will be positioned in such a manner that the gap (G1 in FIG. 7) between the end portions of the track rails 210A-220A on the second module 10B side and the end portions of the track rails 210B-220B on the first module 10A side becomes equal to or less than the predetermined distance.

Therefore, when the modules 10 are connected to each other using the connecting member 300, the relative positions of the track rails 210-220 between the modules 10 can be positioned at appropriate positions. Accordingly, the worker who performs the assembly of the module system 1 can perform the positioning of the modules 10 only by performing the work of connecting the modules 10 to each other using the connecting member 30.

Thus, even a person without special skills can easily perform positioning of the modules 10 when connecting the modules 10 to each other.

(Modification)

In the above-described embodiment, the inner diameter of each fitting hole of the connecting member is formed to be substantially the same as the outer diameter of the pin provided on the attachment surface of each module. In contrast, in the present modification, an example in which the inner diameter of each fitting hole is formed to be larger than the outer diameter of the pin will be described.

FIG. 8 is a view of the connecting member 30 in the present modification as viewed from a back face side. The back plate portion 310 of the connecting member 30 in the present modification is provided with a plurality of through holes 341 and a pair of fitting holes 351-361. The order of arrangement of the plurality of through holes 341 and the pair of fitting holes 351-361 is the same as that in the above-described embodiment. However, the pair of fitting holes 351-361 are processed into holes elongated in the X-axis direction. That is, the pair of fitting holes 351-361 in the present modification are each formed to have a length in the X-axis direction larger than the diameter of the pin 104. Note that in cases where the pair of fitting holes 351-361 are each formed in a perfect circle, the inner diameter thereof may be formed to be larger than the outer diameter of the pin 104. In addition, only one of the pair of fitting holes 351-361 may be formed as an elongated hole or the inner diameter of only either one of them may be formed to be larger than the outer diameter of the pin 104.

The shape and interval of the pair of fitting holes 351-361 in the present modification are determined so that the gap between the end portions of the track rails 210A-220A and the end portions of the track rails 210B-220B becomes equal to or less than the predetermined distance described above even when the connecting member 30 is fixed to the first module 10A and the second module 10B in a state where the first module 10A and the second module 10B are most separated from each other.

In addition, as the pair of fitting holes 351-361 are formed a s described above, the plurality of through holes 340 are formed in such a manner that the inner diameters of the plurality of through holes 341 are each larger than the outer diameter of the screw portion of each fastening bolt.

In cases where the modules 10 are connected to each other using the connecting member 30 in the present modification, it is possible to finely adjust the relative positions of the first module 10A and the second module 10B in the X-axis direction in a state where the pin 104A of the first module 10A is fitted into the fitting hole 361 and the pin 104B of the second module 10B is fitted into the fitting hole 351, before fixing the connecting member 30 to the first module 10A and the second module 10B by means of the fastening bolts.

Therefore, according to the module system 1 of the present modification, a worker assembling the module system 1 can adjust the gap between the modules 10 in the X-axis direction by performing the temporary assembly of the module system 1 in a state where the pins 104 are fitted into the pair of fitting holes 351-361 of the connecting member 30, before fixing the connecting member 30 by means of the fastening bolts. Thus, when the module system of the endless circulation type as illustrated in FIG. 1 is assembled, gaps between the modules 10 in the X-axis direction can be easily adjusted so that gaps between some modules 10 do not become too wide or gaps between some modules 10 do not become too narrow.

Others

In the above-described embodiment and modification, examples in which a connecting member has a function of a leg portion is described, but the connecting member may be configured not to have a function of a leg portion. For example, the connecting member may be formed only by a back plate portion having a pair of fitting holes and a plurality of through holes. In that case, an attachment surface of a module may be provided at a position other than the vicinity of a bottom portion as long as it is in the vicinity of an end portion in the X-axis direction on one side face of the module (a side face on which a support portion protrudes).

REFERENCE SIGNS LIST

1 . . . module system, 10 . . . module, 10A . . . first module, 10B . . . second module, 100 . . . base, 101-102 . . . support portions, 103 (103A-103B) . . . mounting surfaces, 104 (104a-104b) . . . pins, 105 . . . female screw holes, 210-220 (210a-220a, 210b-220b) . . . track rails, 230 . . . drive mechanism, 30 . . . connecting member, 310 . . . back plate portion, 330-30 . . . legs, 340 . . . through holes, 350-360 . . . fitting holes, 351 . . . fitting holes

The invention claimed is:

1. A module system comprising: a first module in which a first guide device is incorporated and a second module in which a second guide device is incorporated, the first module and the second module being positioned along a guide direction, the module system further comprising:

a first positioning portion configured to position the first module and the second module in such a manner that a gap between an end portion of the first guide device on a second module side and an end portion of the second guide device on a first module side is a predetermined distance; and a second positioning portion configured to position the first module and the second module in such a manner that a shift between an axial direction of the first guide device and an axial direction of the second guide device in a direction orthogonal to the guide direction in a plan view is equal to or less than a predetermined amount of shift, wherein the first positioning portion comprises:

a first pin provided on the first module and protruding in the direction orthogonal to the guide direction in a plan view;

a second pin provided on the second module and protruding in the direction orthogonal to the guide direction in a plan view; and a first connecting member having a first fitting hole and a second fitting hole arranged in the guide direction, the first connecting member being fixed to the first module and the second module in a state where the first pin is fitted into the first fitting hole and the second pin is fitted into the second fitting hole.

2. The module system according to claim 1, wherein at least one of the first fitting hole and the second fitting hole is formed to have a length in the guide direction larger than a diameter of the first pin and a diameter of the second pin.

3. The module system according to claim 1, wherein the second positioning portion comprises:

a first attachment surface provided in the vicinity of an end portion of a side face of the first module on the second module side, and formed by a vertical surface extending along the guide direction;

a second attachment surface provided in the vicinity of an end portion of a side face of the second module on the first module side, and formed by a vertical surface extending along the guide direction; and a second connecting member fixed to the first attachment surface and the second attachment surface in such a manner that the first attachment surface and the second attachment surface are flush with each other.

4. The module system according to claim 3, wherein the first pin is provided on the first attachment surface;

the second pin is provided on the second attachment surface; and the first connecting member and the second connecting member are integrally formed with each other.

\* \* \* \* \*